(12) United States Patent
Mutikainen

(10) Patent No.: US 9,955,422 B2
(45) Date of Patent: Apr. 24, 2018

(54) USER EQUIPMENT POWER OPTIMIZATION

(71) Applicant: Nokia Technologies Oy, Espoo (FI)

(72) Inventor: Jari Kalevi Mutikainen, Lepsämä (FI)

(73) Assignee: Nokia Technologies Oy, Espoo (FI)

( * ) Notice: Subject to any disclaimer, the term of this patent is extended or adjusted under 35 U.S.C. 154(b) by 148 days.

(21) Appl. No.: 15/027,552

(22) PCT Filed: Oct. 31, 2013

(86) PCT No.: PCT/US2013/067876
§ 371 (c)(1),
(2) Date: Apr. 6, 2016

(87) PCT Pub. No.: WO2015/065457
PCT Pub. Date: May 7, 2015

(65) Prior Publication Data
US 2016/0255584 A1    Sep. 1, 2016

(51) Int. Cl.
*H04W 52/02* (2009.01)
*H04J 3/06* (2006.01)
(Continued)

(52) U.S. Cl.
CPC ....... *H04W 52/0216* (2013.01); *H04J 3/0638* (2013.01); *H04W 8/24* (2013.01); *H04W 52/0229* (2013.01); *H04W 74/006* (2013.01); *H04W 4/80* (2018.02); *Y02D 70/00* (2018.01); *Y02D 70/1222* (2018.01); *Y02D 70/1224* (2018.01); *Y02D 70/1242* (2018.01);
(Continued)

(58) Field of Classification Search
None
See application file for complete search history.

(56) References Cited

U.S. PATENT DOCUMENTS 8,121,045 B2 * 2/2012 Cai ................. H04L 1/1829
370/252
8,849,272 B2 * 9/2014 Hsu ................. H04W 88/06
370/328
(Continued)

FOREIGN PATENT DOCUMENTS

EP    1039721    9/2000
EP    1139232    10/2001
(Continued)

OTHER PUBLICATIONS

International Search Report and Written Opinion received for corresponding Patent Cooperation Treaty Application No. PCT/US2013/067876, dated Aug. 8, 2014, 8 pages.

*Primary Examiner* — Bunjob Jaroenchonwanit
(74) *Attorney, Agent, or Firm* — Harrington & Smith

(57) ABSTRACT

Methods and apparatus, including computer program products, are provided for power optimization. In one aspect there is provided a method. The method may include receiving, at a user equipment, configuration information including an active time wherein the active time is less than an allowed clock drift of a clock at the user equipment; and receiving, at the user equipment, data sent in advance by an application server, wherein the advance comprises a time based on at least the allowed clock drift. Related apparatus, systems, methods, and articles are also described.

20 Claims, 5 Drawing Sheets

(51) Int. Cl.
*H04W 8/24* (2009.01)
*H04W 74/00* (2009.01)

(52) U.S. Cl.
CPC ...... *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/24* (2018.01)

(56) References Cited

U.S. PATENT DOCUMENTS

| | | | |
|---|---|---|---|
| 2005/0172026 A1 | 8/2005 | Jeon et al. | |
| 2008/0299979 A1* | 12/2008 | Ko | H04W 60/04 455/442 |
| 2012/0214443 A1* | 8/2012 | Daigle | H04L 9/3228 455/411 |
| 2014/0064166 A1* | 3/2014 | HomChaudhuri | H04W 52/0216 370/311 |
| 2014/0218235 A1* | 8/2014 | Leclercq | G01S 19/34 342/357.63 |
| 2014/0293851 A1* | 10/2014 | Abraham | H04W 52/0225 370/311 |
| 2015/0109976 A1* | 4/2015 | Zhang | H04W 72/1215 370/280 |
| 2015/0282208 A1* | 10/2015 | Yi | H04W 72/121 370/329 |
| 2017/0150447 A1* | 5/2017 | Kim | H04W 52/0241 |

FOREIGN PATENT DOCUMENTS

| | | |
|---|---|---|
| EP | 1962473 | 8/2008 |
| WO | 0195695 | 12/2001 |
| WO | 2007102165 | 9/2007 |
| WO | 2008037083 | 4/2008 |
| WO | 2011066162 | 6/2011 |

\* cited by examiner

300

```
┌─────────────────────────────────────────────┐
│ RECEIVE, AT UE, CONFIGURATION INFORMATION    │
│ INCLUDING AN ACTIVE TIME DURING AN IDLE MODE,│
│ WHEREIN THE ACTIVE TIME IS CONFIGURED TO BE  │──── 305
│ LESS THAN THE PERMITTED CLOCK DRIFT FOR A    │
│ TIMER BEING USED AT THE UE                   │
└─────────────────────────────────────────────┘
                      │
┌─────────────────────────────────────────────┐
│ RECEIVE, AT THE UE, DATA SENT IN ADVANCE OF THE│
│ UE'S SCHEDULED ACTIVE TIME, THE ADVANCE BASED │──── 310
│ ON AT LEAST THE PERMITTED CLOCK DRIFT         │
└─────────────────────────────────────────────┘
```

FIG. 3

USER EQUIPMENT POWER OPTIMIZATION

RELATED APPLICATION

This application was originally filed as a PCT Application No. PCT/US2013/067876 filed Oct. 31, 2013.

FIELD

The subject matter described herein relates to wireless communications.

BACKGROUND

User equipment may be configured to operate in a connected mode, an idle mode, and, more recently, a power savings mode in accordance with a specification, such as 3GPP 3rd Generation Partnership Project; Technical Specification Group Services and System Aspects; Architecture enhancements to facilitate communications with packet data networks and applications (Release 11), 3GPP TS 23.682 V11.5.0 (2013-09) (hereinafter TS 23.682). This power savings mode may be particularly useful in certain use cases, such as machine-to-machine devices and the like, although the power savings mode may be used in other use cases as well. The power savings mode (or state) may be adopted by the user equipment, in which case a relatively longer period of inactivity may be implemented at the user equipment. The inactivity may range from one or more minutes to one or more hours (or longer). The user equipment may be configured so that the user equipment is reachable for downlink data only during the time that the user equipment is in a connected mode (for example, a radio resource control (RRC) S1 connected state) and a certain active time period following the connected state, during which the user equipment is reachable for paging. For example, the user equipment may start an active timer after transiting to the idle mode. When the active timer expires, the user equipment changes to another mode, such as a power saving state or other mode. Depending on the user equipment's configuration, the applications of the user equipment may change the user equipment back to a normal, connected operation mode, when an application at the user equipment needs to transfer data.

During the power saving state, the user equipment is not typically reachable by the network. Therefore, the receivers and/or transmitters at the user equipment can be deactivated, so power saving can be achieved. The user equipment may stay in the power saving state for the duration of a timer, such as a periodic tracking area update (P-TAU) timer, such as timer T3412). The periodic tracking area update timer may be negotiated in the network access stratum level during an attach procedure. The periodic tracking area update timer is used by the user equipment to notify the user equipment's availability to the application server in the network. The value of timer T3412 may be sent by the network to the user equipment in an attach accept message, and may be sent in a tracking area update accept message. When the periodic tracking area update timer expires, the user equipment initiates a periodic tracking area procedure and stays in a regular idle/registered state for the period of activity time, which is also negotiated with the network during the attach procedure. When in the regular idle state, the user equipment uses the normal idle mode discontinuous receive (DRX) procedure to save power/battery. This DRX cycle is configurable and can be set to a time up to 2.54 seconds, although other times may be implemented as well.

SUMMARY

Methods and apparatus, including computer program products, are provided for power optimization.

In some example embodiments, there is provided a method. The method may include receiving, at a user equipment, configuration information including an active time wherein the active time is less than an allowed clock drift of a clock at the user equipment; and receiving, at the user equipment, data sent in advance by an application server, wherein the advance comprises a time based on at least the allowed clock drift. Related apparatus, systems, methods, and articles are also described.

In some variations, one or more of the features disclosed herein including the following features can optionally be included in any feasible combination. A period tracking area update cycle may include an idle state and the active time. The period tracking area update cycle may represent a power saving mode at the user equipment. The allowed clock drift may be specified based on at least a duration of the period tracking area update cycle. The user equipment may be synchronized to at least an application server sending the data in advance. During the active time, the user equipment may activate at least one receiver to at least listen to a broadcast control channel. The data sent in advance of the active time may be buffered until a tracking area update message is received, and wherein at least one of an application server and a serving gateway buffers the sent data. The user equipment may send an amount of buffering to a mobility management entity, wherein the amount is based at least on the allowed clock drift. The configuration information is received during a network access stratum negotiation. The active time may represent a time when the user equipment is configured to receive a page. The data sent in advance by an application server may include data sent in advance of a schedule time during which the user equipment receives a page.

In some example embodiments, there may be provided another method, which may include receiving, at a network node, a downlink data notification message, wherein the downlink data notification message indicates data sent in advance of an active time at a user equipment; buffering, in response to the received downlink data notification message, a page from the network node to the user equipment, when the user equipment is not in the active time; and sending to the user equipment the data sent in advance of the active time, when a connection is received at the network node.

In some variations, one or more of the features disclosed herein including the following features can optionally be included in any feasible combination. The active time may be less than an allowed clock drift of a clock at the user equipment. The active time may be less than an allowed clock drift and a network delay. The advance may be time based on at least the allowed clock drift. The network node may include a mobility management entity.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 3 depicts an example of a process at a user equipment for power savings, in accordance with some exemplary embodiments;

Figure 1:
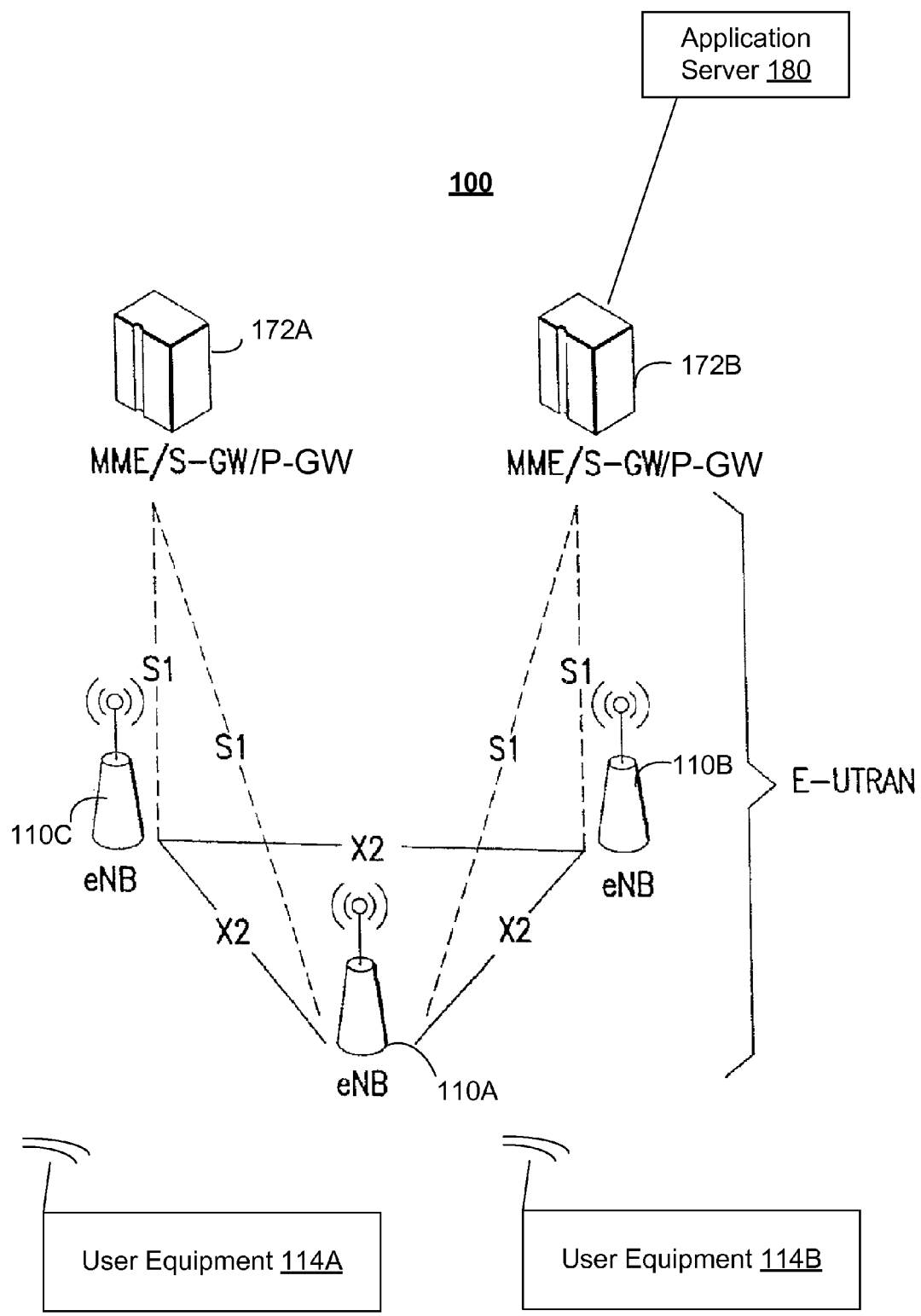
FIG. 1 depicts an example of a system configured to optimize user equipment power, in accordance with some exemplary embodiments.

Like labels are used to refer to same or similar items in the drawings.

DETAILED DESCRIPTION

The power saving state may, as noted, provide a way for the user equipment to save power. However, during the power saving state, the user equipment is not reachable by the network. As such, an application server may need to buffer mobile terminated (MT) data during the power saving mode/state. To obtain buffered data from the application server when the user equipment wakes up from the power savings state, the user equipment may poll the application server by, for example, sending a query to the application server to pull the buffered MT data. In addition or alternatively, the application server may push the buffered MT data to the user equipment.

The user equipment (or mobile originated) pull may consume more power when compared to the push because the user equipment may activate a transmitter once for each reachability cycle to check whether the application server has data. If there is no data, transmitter power is been wasted. As such, the pull by the user equipment may be considered less power efficient than the network/application server push.

For the network/application server push (or mobile terminated) push, the application server may receive a notification from the core network that the user equipment has awakened (i.e., no longer in a power saving state). However, using the notifications may cause substantial performance issues to the core network elements with respect to reporting the state of millions of user equipment to application servers. Alternatively or additionally, the application server and user equipment may be kept in synchronization, so that the application server knows when the user equipment is awake or has entered the power savings state. Synchronization of the application server and user equipment may be more power efficient for the user equipment, when compared to the user equipment pull, as well less burdensome on the network when compared to sending notifications.

In some example embodiments, the subject matter disclosed herein relates to user equipment power optimization in which data is pushed from a network node to a synchronized user equipment in advance of an activity window at the user equipment. For example, an application server may, in some example embodiments, push data, such as MT data, to a user equipment in advance of an activity time at the synchronized user equipment. The activity time is a time when the user equipment is in idle mode but listening to a page or a broadcast control channel. By sending the data in advance, the possibility that the network node misses, due to clock drift, the user equipment's short activity time may be reduced.

Whenever a user equipment activates a receiver to read (or otherwise listen to) a page while in idle mode (during a reachability cycle) power is consumed. For example, if the reachability cycle is 54 minutes and the activity time is 1 minute (which is the time the user equipment stays awake), the number of receiver activations is 0.00729 receiver activations per second ((1 min×60 sec/min/2.54 sec)/(54 min×60 sec/min)). As such, the receiver is turned on during the DRX cycle (for example, every 2.54 seconds during the 1 minute) during the idle state; for each P-TAU cycle (which in this example is 54 minutes) there is one period of idle state, which lasts for 1 minute in this example.

To save power, the periodic tracking area update timer value may be increased but that increase causes more delay to the MT data being delivered to the user equipment (which may not be suitable for applications that cannot tolerate the increased delay). To improve the power saving when additional delay is not desired, the activity time can be shortened. Returning to the previous example, reducing the activity time to 10 seconds, yields a one-sixth reduction in receiver activations and a corresponding a one-sixth reduction in user equipment power consumption. However, reducing the activity time/window may make it more difficult for the application server to reach the user equipment during the shortened awake-period, especially when the user equipment and application server clocks are not well synchronized due to clock drifting in the user equipment. A certain amount of drift is expected and/or specified. For example, TS 36.133 defines the allowed inaccuracy of the user equipment timers longer than 4 seconds as less than +/−2.5%. In this example where the reachability cycle is 54 minutes, the user equipment clock may drift up to +/−81 seconds (+/−1 minute and 21 seconds) during the reachability cycle. Due to this permitted clock drift, it is possible that the application server may not reach the user equipment during the user equipment's awake-period, when the activity time is shorter than the permitted drift of 1 minute and 21 seconds.

FIG. 1 depicts a system 100 which may include one or more user equipment 114A-B coupled wirelessly to one or more base stations, such as base stations 110A-C (labeled eNB, evolved Node B). The system 100 may further include other nodes, such as a mobility management entity (MME), a serving gateway (SGW), and/or a packet gateway (PGW) 172A-B. The system 100 may also include one or more application servers, such as application server 180.

Although FIG. 1 depicts an E-UTRAN (Evolved Uniform Mobile Telecommunications System Terrestrial Radio Access Network), other frameworks may be used as well.

In the case of E-UTRAN, eNB base stations may provide an E-UTRA (Evolved Universal Terrestrial Radio Access) user plane and control plane protocol terminations towards the user equipment. The eNB base stations may be interconnected with each other by an X2 interface. The eNB base stations may also be connected via an S1 interface to an Evolved Packet Core (EPC) including other nodes, such as a mobility management entity (MME), a serving gateway (SGW), and/or a packet gateway (PGW).

In some example embodiments, a network node, such as the application server 180, may send data (for example, MT data) towards the user equipment (via, for example, an internet protocol (IP) bearer to the MME/SGW/PGW 172B)

in advance of the active time during a reachability cycle. Moreover, the amount of advance may be based on an amount of allowable clock drift. Returning to the previous example where user equipment timers are allowed to drift by +/−2.5%, the application server 180 may send the MT buffered data to user equipment 114A at least 81 seconds (1 minute and 21 seconds) before the user equipment wakes up, becomes active, and/or activates its receiver during the idle period.

Figure 2:
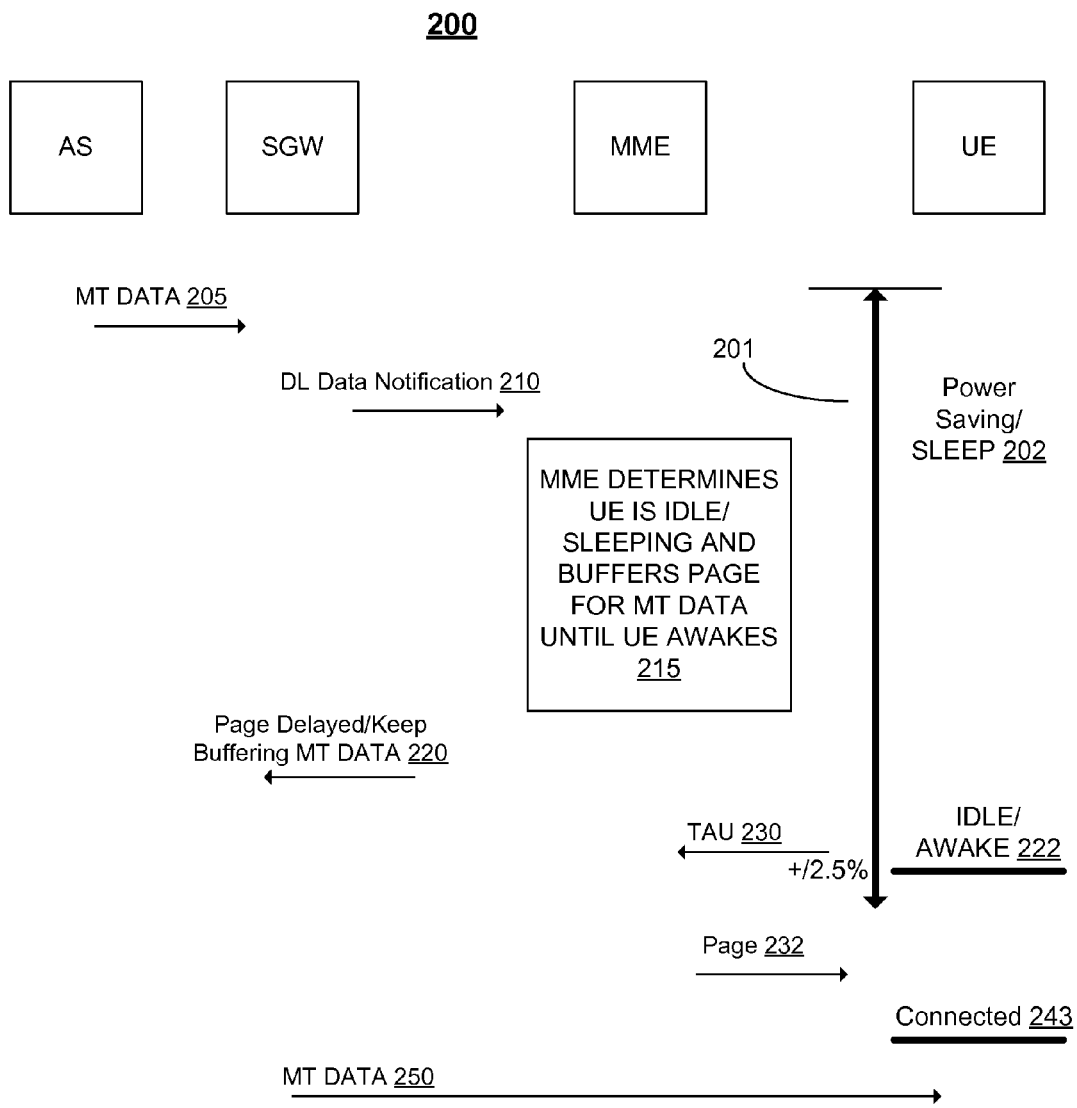
FIG. 2 depicts an example of a process for sending data in advance of an active window at the user equipment to enable power savings at the user equipment, in accordance with some exemplary embodiments.

FIG. 2 depicts a signaling diagram 200, in accordance with some example embodiments.

In some example embodiments, the application server (AS) and the user equipment (UE) may be in synchronization. Moreover, the user equipment may be configured to have an active time of the idle mode to be less than the permitted clock drift for a timer being used at the user equipment. For example, the user equipment's clock may be allowed to drift up to +/−81 seconds, but despite the synchronization and drift, the active time for the DRX idle mode is configured to 1 minute.

When a serving gateway (SGW) receives downlink data at 205, the SGW may send, at 210, a downlink data notification to a mobility management entity (MME). The MME may respond by initiating a page of the user equipment to which the downlink data is destined, unless the user equipment is sleeping due to being in power saving mode and therefore not reachable for the MME. The user equipment may be sleeping while in a DRX sleep state, although reachable by a page.

At 215, the mobility management entity may determine whether the user equipment is sleeping 202 (for example, in a power saving mode or other mode having at least an inactive receiver) or awake (for example, in a connected mode or other mode having at least an active receiver listening for pages and the like). The mobility management entity may be able to determine whether the user equipment is awake or asleep, because when the user equipment wakes up, the user equipment may send a tracking area update (TAU) message to the mobility management entity, which allows the mobility management entity to set the active timer.

However, if the mobility management entity determines at 215 that the user equipment is asleep and that the user equipment is supposed to wake up within a certain time period, the mobility management entity may be configured to buffer a page to the user equipment at 215. The mobility management entity may buffer the page for the MT terminated data until the user equipment wakes up, which should be at the expiry of for example the periodic tracking area update timer (timer T3412) at the mobility management entity.

At 220, the mobility management entity may, in some example embodiments, send an indication to a network node, such as the serving gateway and the like, that paging to the user equipment is delayed and that the serving gateway should buffer DL data 205 for longer than normal.

At 222, the user equipment may awake and become active (for example, as part of a periodic TAU timer T3412 expiration) during the power saving mode of the reachability cycle. Due to permitted clock drifting in user equipment, the anticipated wake up of the user equipment may vary. Referring to the previous +/−2.5% drift example, the user equipment may at 201 or 222 become active 1 min and 21 seconds earlier or later than expected by the network nodes, such as the application server, mobility management entity, and the like. In this example, the application server may send the downlink data to the core network nodes 1 min and 21 seconds in advance (i.e., earlier than) the user equipment would become active without possible clock drifting in the user equipment, and network nodes, such as the mobility management entity, may need to be able to store the paging for 2 minutes and 42 seconds for a reachability cycle of 54 minutes. If the mobility management entity receives a DL data notification earlier than this (for example earlier than 2 minutes and 42 seconds before the user equipment becomes active), the mobility management entity may not page the user equipment but instead may send a DL data notification reject to the serving gateway.

In some example embodiments, the mobility management entity may, as noted, have a buffer sufficient to store MT data given the allowed or specified drift of the clock. Referring to the above example where the clock drift is allowed to drift by plus or minus 2.5 degrees, the mobility management entity may need a buffer for at least 5% of the P-Tau cycle (which in this example is 54 minutes).

Once the user equipment wakes up, the user equipment may move to connected state and send a tracking area update message at 230 to the mobility management entity (which may notify other nodes as well including the application server and/or serving gateway), and the user equipment may move to an idle state with idle mode DRX activated. The mobility management entity may then page at 232 the user equipment to signal buffered MT data to be sent via the downlink. The user equipment may then enter the connected mode, at 243, and then receive the MT data (which was initially sent/buffered at 205 in advance of the scheduled active time).

The mobility management entity may, in some example embodiments, activate the user plane by a network initiated service request procedure upon reception of periodic tracking area update, when the user equipment has moved to connected mode and the mobility management entity knows it has buffered paging for downlink data.

To send the initial downlink data packet to the user equipment, the application server may, in some example embodiments, implement a push protocol, such as a user datagram protocol (UDP) push, a wireless access protocol (WAP) push to port 2948, and the like. Firewalls in the network (for example, in the packet gateway) may be configured to enable the push to this port. The application protocol on top of UDP may be configured to tolerate the delay caused by buffering in MME/SGW, and not to retransmit the UDP push during this period.

FIG. 3 depicts a process 300 for user equipment power consumption optimization, in accordance with some example embodiments. The description of FIG. 3 also refers to FIGS. 1 and 2.

At 305, the user equipment 114A may receive configuration information including an active time during an idle mode, in accordance with some example embodiments. The active time may be configured to be less than the permitted clock drift for a timer being used at the user equipment. For example, if the reachability cycle during a power saving mode is 54 minutes, the user equipment's clock may drift up to +/−81 seconds (+/−1 minute and 21 seconds). Despite the drift, the active time for the DRX idle mode is configured to 1 minute in this example.

At 310, the user equipment 114A may receive data sent in advance of the user equipment's scheduled active time, in accordance with some example embodiments. For example, user equipment 114 may receive MT data sent by the application server 180 in advance 201 of the scheduled awake or active time at 222. Moreover, the amount of advance may be based on the allowed/specified clock drift.

Referring to the previous example, the application server 180 may send MT data to user equipment 114A up to about 1 minute and 21 seconds in advance (for example, at time 201) of the scheduled awake or active time, which in this example is an active window of 1 minute. This data sent in advance may be buffered at the application server or other network node (for example, the serving gateway) until after the tracking area update message 230 is received by the network, which results in the buffered data being delivered to the user equipment at 250.

In some example embodiments, the application server is an entity in an internet protocol network, which communicates with an application client at the user equipment using the application protocol over IP. In some example embodiments, the mobility management entity and user equipment may negotiate timer values in non-access stratum (NAS) level, and the application client in the user equipment may inform the application server regarding the negotiated timer values. Specifically, mobility management entity may indicate the buffering capability (for example the maximum length of the buffer in seconds) in the core network (for example, mobility management entity, serving gateway) to the user equipment. And, the application client in the user equipment may indicate the buffering capability to the application server. The application server may also configure the initial timer values at the user equipment, which are then used in the NAS level when the user equipment suggests the initial timer values to the mobility management entity. The mobility management entity may then decide the final values to be used for the timer, and the negotiated timer values may be sent to the application server. The mobility management entity and user equipment may re-negotiate timer values in non-access stratum (NAS) level (for example when the user equipment moves to a new tracking area and a new mobility management entity is selected), and the application client in the user equipment may inform the application server regarding the re-negotiated timer values and buffering capability.

Figure 4:
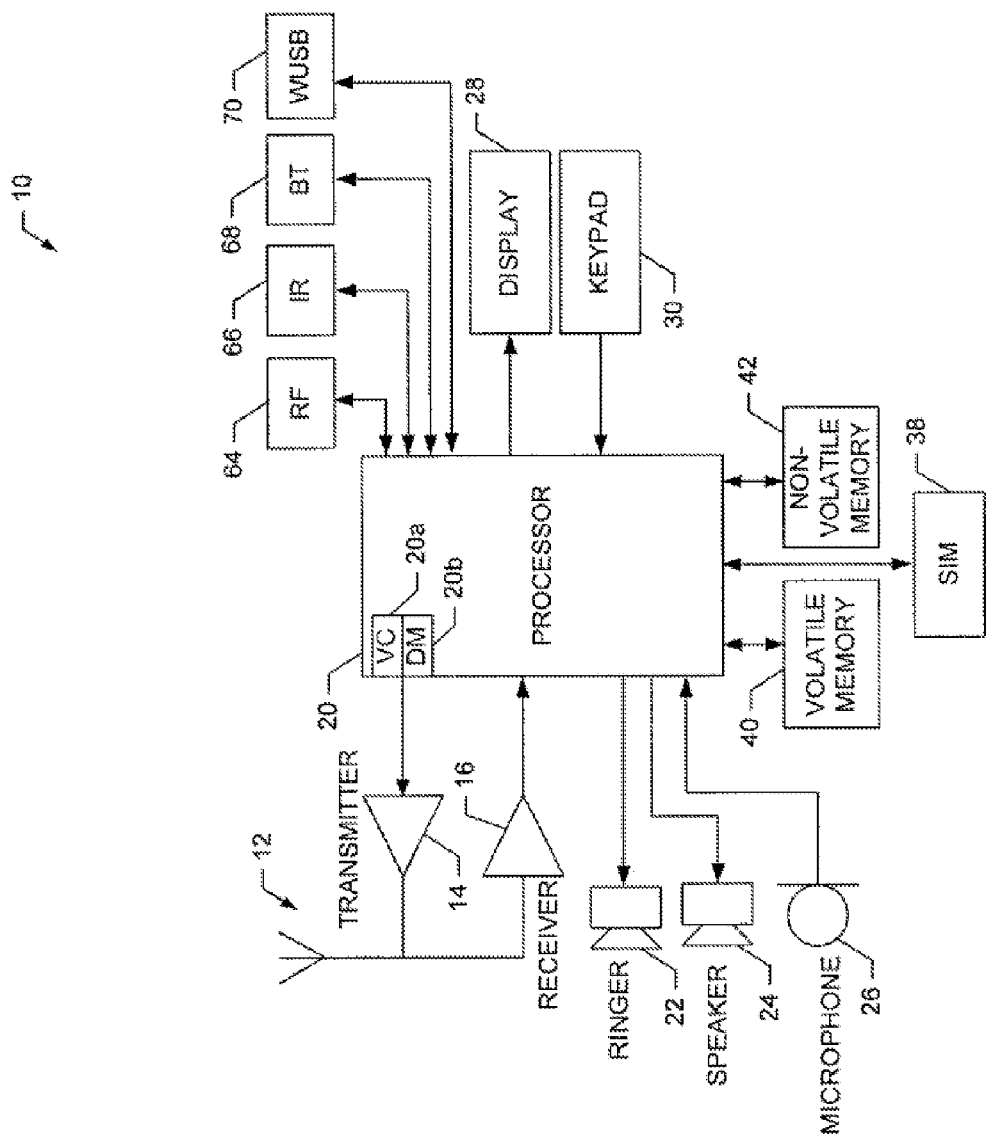
FIG. 4 depicts an example of an apparatus, in accordance with some exemplary embodiments.

FIG. 4 illustrates a block diagram of an apparatus 10, which can be configured as a wireless device, in accordance with some example embodiments. For example, apparatus 10 may be implemented at wireless devices 114A-B. Apparatus 10 may be implemented as a smart phone, mobile station, a mobile unit, a subscriber station, a wireless terminal, a tablet, a wireless plug-in accessory, or any other device with a short-range transceiver, such as Bluetooth, Bluetooth Low Energy, and the like. In some example embodiments, one or more portions of the apparatus 10 may be incorporated into a media player, such as a television, wireless speaker, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to, and receive signals from, the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory.

In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy link, ZigBee link, a cellular device-to-device link, a wireless local area link, a Wi-Fi link, and/or any other short-range radio technology. In this regard, the apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to the user equipment and devices, such as the functions disclosed at processes 200, 300, and any other operations disclosed with respect to the user equipment. For example, the user equipment may operate in synchrony with network nodes including the application server, receive configuration information, and receive MT data sent in advance of the user equipment's activity window in order to avoid missing the activity window (which may be configured to be less than the allowed clock drift at the synchronized user equipment). The memories may comprise an identifier, such as an international mobile equipment identification (IMEI) code, capable of uniquely identifying apparatus 10. In some example embodiments, the processor 20 may be configured using computer code stored at memory 40 and/or 42 to enable operations disclosed with respect to the user equipment.

Figure 5:
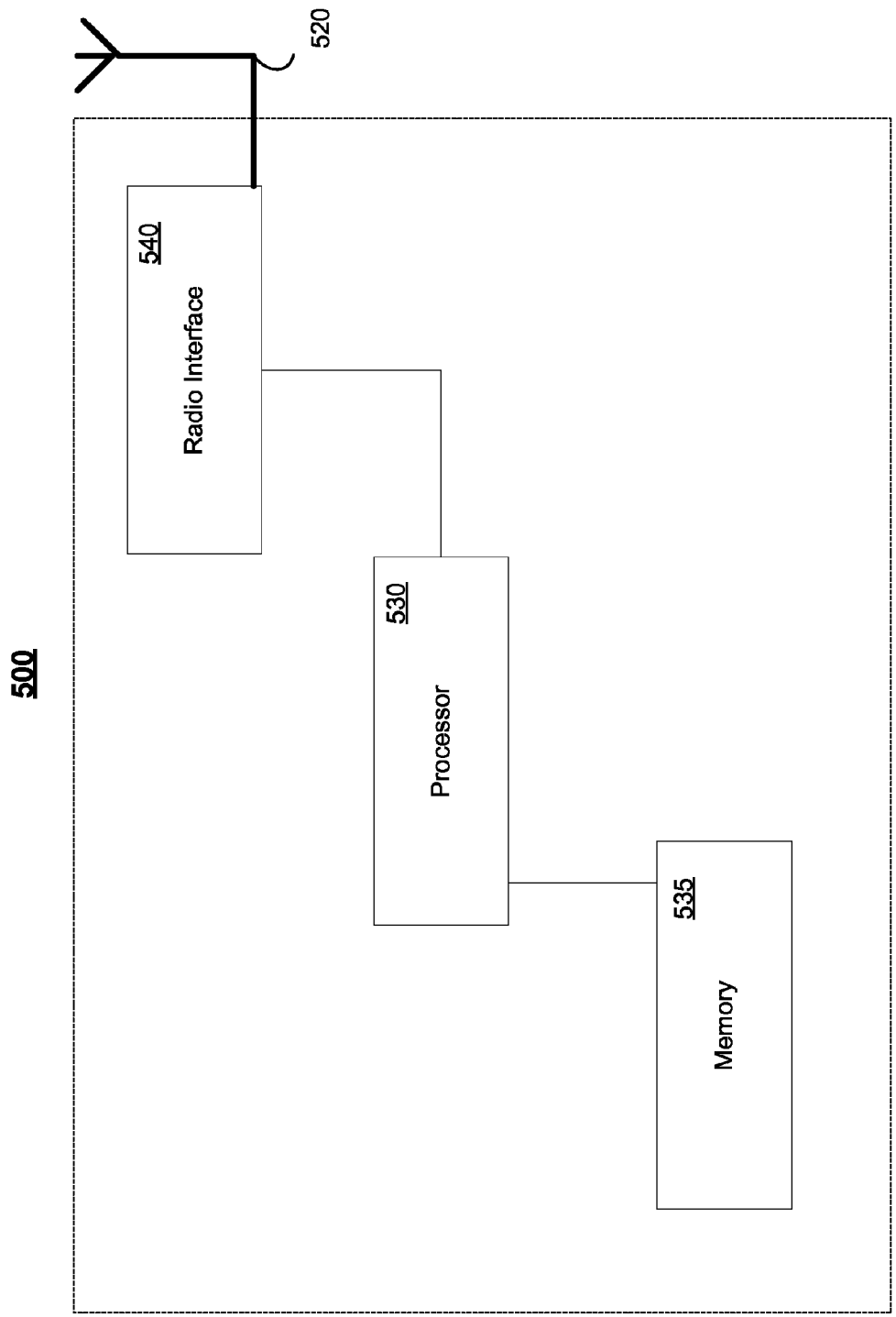
FIG. 5 depicts an example of a network node, in accordance with some exemplary embodiments.

FIG. 5 depicts an example implementation of a network node 500, such as for example a base stations 110A-C, MME, SGW, PGW, AS, and the like. The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 540 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The MME, SGW, PGW, and AS may also be configured as network nodes as disclosed herein but may, in some implementations, include a wired interface, rather than a radio interface. The network node 500 may further include one or more processors, such as for example processor 530, for controlling the network node 500 and for accessing and executing program code stored in memory 535. In some example embodiments, memory 535 includes code, which when executed by at least one processor causes one or more of the operations described herein with respect to network node, such as for example a base station, access point, and the like. For example, network node 500 may send data in advance of the active window at the user equipment, buffer data, and/or any other operation disclosed herein with respect to a network node.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 4 and 5. A computer-readable medium may comprise a non-transitory computer-readable storage medium that may be any media that can contain or store the instructions for use by or in connection with an instruction execution system, apparatus, or device, such as a computer. In addition, some of the embodiments disclosed herein include computer programs configured to cause methods as disclosed herein.

Without in any way limiting the scope, interpretation, or application of the claims appearing below, a technical effect of one or more of the example embodiments disclosed herein is enhanced power savings at the user equipment by facilitating shorter activity windows at the user equipment during which the user equipment activates a receiver.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. An apparatus, comprising:
    at least one processor; and
    at least one memory circuitry including computer program code, the at least one memory and the computer program code configured to, with the at least one processor, cause the apparatus to perform at least the following:
    receive, at a user equipment and from a network in a wireless communication system, configuration information including an active time, wherein the active time is less than an allowed clock drift of a clock at the apparatus, and wherein the active time is a time period during which the user equipment is reachable for paging; and
    perform as part of the active time:
        wake up, by the user equipment, from a power saving mode;
        respond to a page at least by receiving, at the apparatus and from a network, downlink data, the downlink data previously sent in advance of the active time by an application server to the network, wherein an amount of the advance comprises a time based on at least the allowed clock drift.

2. An apparatus as in claim 1, wherein a periodic tracking area update cycle includes an idle state and the active time, and wherein the allowed clock drift is specified based on at least a duration of the periodic tracking area update cycle.

3. An apparatus as in claim 2, wherein the periodic tracking area update cycle represents a power saving mode at the apparatus.

4. An apparatus as in claim 1, wherein the apparatus sends an indication of an amount of available buffering for the downlink data to the application server, wherein the amount of available buffering is based at least on the allowed clock drift and is received from the network.

5. An apparatus comprising:
    at least one processor; and
    at least one memory circuitry including computer program code, the at least one memory and the computer program code configured to, with the at least one processor, cause the apparatus to perform at least the following:
    send, by the apparatus in a wireless communication system and to a user equipment in the system, configuration information including an active time, wherein the active time is less than an allowed clock drift of a clock at the user equipment, and wherein the active time is a time period during which the user equipment is reachable for paging;
    receive, at the apparatus, a downlink data notification message, wherein the downlink data notification message indicates data sent in advance of an active time at a user equipment, wherein an amount of the advance comprises a time based on at least the allowed clock drift for the user equipment;
    buffer, in response to the received downlink data notification message, the data and a corresponding page from the apparatus to the user equipment, in response to the user equipment not being in the active time; and
    send to the user equipment the page and the data buffered in advance of the active time, in response to a connection being received from the user equipment at the apparatus, the connection indicating the user equipment is in the active time.

6. An apparatus as in claim 5, wherein the active time is less than an allowed clock drift and a network delay.

7. An apparatus as in claim 5, wherein the data comprises a time based on at least the allowed clock drift.

8. An apparatus as in claim 5, wherein a periodic tracking area update cycle includes an idle state and the active time, and the allowed clock drift is specified based on at least a duration of the periodic tracking area update cycle.

9. An apparatus as in claim 8, wherein the periodic tracking area update cycle represents a power saving mode at the user equipment.

10. An apparatus as in claim 5, wherein the apparatus is synchronized to the user equipment.

11. An apparatus as in claim 5, wherein at least one memory and the computer program code are configured to, with the at least one processor, cause the apparatus to perform at least the following: send to the user equipment an indication of an amount of available buffering for the data, wherein the amount of available buffering is based at least on the allowed clock drift.

12. An apparatus as in claim 11, wherein at least one memory and the computer program code are configured to, with the at least one processor, cause the apparatus to perform at least the following: receive an indication from the user equipment of the amount of available buffering for the data, and send the indication to the application server.

13. A method, comprising:
sending, by an apparatus in a wireless communication system and to a user equipment in the system, configuration information including an active time, wherein the active time is less than an allowed clock drift of a clock at the user equipment, and wherein the active time is a time period during which the user equipment is reachable for paging;
receiving, at the apparatus, a downlink data notification message, wherein the downlink data notification message indicates data sent in advance of an active time at a user equipment, wherein an amount of the advance comprises a time based on at least the allowed clock drift for the user equipment;
buffering, in response to the received downlink data notification message, the data and a corresponding page from the apparatus to the user equipment, in response to the user equipment not being in the active time; and
sending to the user equipment the page and the data buffered in advance of the active time, in response to a connection being received from the user equipment at the apparatus, the connection indicating the user equipment is in the active time.

14. A method as in claim 13, wherein the active time is less than an allowed clock drift and a network delay.

15. A method as in claim 13, wherein the data comprises a time based on at least the allowed clock drift.

16. A method as in claim 13, wherein a periodic tracking area update cycle includes an idle state and the active time, and the allowed clock drift is specified based on at least a duration of the periodic tracking area update cycle.

17. A method as in claim 16, wherein the periodic tracking area update cycle represents a power saving mode at the user equipment.

18. A method as in claim 13, wherein the apparatus is synchronized to the user equipment.

19. A method as in claim 13, sending to the user equipment an indication of an amount of available buffering for the data, wherein the amount of available buffering is based at least on the allowed clock drift.

20. A method as in claim 19, further comprising receiving an indication from the user equipment of the amount of available buffering for the data, and sending the indication to the application server.

* * * * *